United States Patent [19]

Esper et al.

[11] 4,183,798
[45] Jan. 15, 1980

[54] STABILIZED ZIRCONIUM DIOXIDE COMPOSITIONS AND OXYGEN SENSORS UTILIZING SAID COMPOSITIONS

[75] Inventors: Friedrich J. Esper; Karl-Hermann Friese, both of Leonberg, Fed. Rep. of Germany

[73] Assignee: Robert Bosch GmbH, Stuttgart, Fed. Rep. of Germany

[21] Appl. No.: 888,161

[22] Filed: Mar. 20, 1978

[30] Foreign Application Priority Data

Apr. 1, 1977 [DE] Fed. Rep. of Germany ....... 2714558

[51] Int. Cl.² ...................... C04B 35/48; G01N 27/58
[52] U.S. Cl. .................................. 204/195 S; 106/57
[58] Field of Search .............. 106/57; 204/195 S, 1 S; 429/193, 30, 31, 32, 33

[56] References Cited

U.S. PATENT DOCUMENTS

| | | | |
|---|---|---|---|
| 3,404,040 | 10/1968 | Mitoff et al. | 106/57 X |
| 3,518,100 | 6/1970 | Whittemore | 106/57 |
| 3,565,645 | 2/1971 | Anderson | 106/57 |
| 3,607,323 | 9/1971 | Tedmon et al. | 106/57 |
| 3,632,359 | 1/1972 | Alper et al. | 106/57 |

OTHER PUBLICATIONS

Pol Duwez et al., J. Amer. Ceramic Soc., vol. 35, No. 5, pp. 107–113, (1952).

*Primary Examiner*—G. L. Kaplan
*Attorney, Agent, or Firm*—Frishauf, Holtz, Goodman & Woodward

[57] ABSTRACT

Stabilized zirconium dioxide compositions sintered with a silicate flux and stabilized with (i) calcium oxide and (ii) magnesium oxide. The stabilized zirconium dioxide can be sintered at temperatures between 1460° C. and 1480° C. to form solids having high mechanical strength and a specific resistance of 1MΩcm at a low temperature. The invention also provides oxygen sensors containing at least one measuring cell which is an oxygen concentration cell having two electrodes separated by and in ionic communication through a solid stabilized zirconium dioxide electrolyte which is prepared from the said compositions.

4 Claims, 2 Drawing Figures

STABILIZED ZIRCONIUM DIOXIDE COMPOSITIONS AND OXYGEN SENSORS UTILIZING SAID COMPOSITIONS

BACKGROUND OF THE INVENTION

It is known to use solid ion-conductive electrolytes composed of stabilized zirconium dioxide in the oxygen concentration measuring cells which are used (one or a plurality) in oxygen sensors, particularly those used to sense or measure the oxygen content of the exhaust gases from internal combustion engines. Zirconium dioxide composition stabilized with calcium oxide and containing silicon dioxide and often aluminum silicate is known (U.S.-PS No. 3,978,006). This composition has the disadvantage that it is necessary to sinter it at a temperature above 1500° C. Such compositions also have further disadvantages in that solid articles formed from said sintered compositions do not have adequate mechanical strength and the temperature at which the specific resistance reaches the value of 1MΩ cm is higher than desired.

Highly refractory zirconium dioxide compositions are known which have a high melting (fusion) point and are highly resistant to reduction; which zirconium dioxide contains metal oxide additives, e.g., alkaline earth metal oxide, magnesium oxide, aluminum oxide, the rare earth oxides, etc., in amounts of about 5% (DE-PS No. 469,204). Such compositions cannot contain silicic acid (i.e., silicon dioxide). This is apparent since such compositions must be able to resist temperatures above 2000° C. in their service wherein they are used as heating elements in electric furnaces.

Another highly refractory zirconium dioxide composition is prepared by admixing small amounts of magnesium oxide or aluminum oxide and the powdered composition prepared in the form of a paste using a saline (salt) solution additive, e.g., magnesium chloride (DE-PS No. 543,772). Such zirconium dioxide compositions require a sintering temperature in excess of 1650° C. The solid sintered articles prepared therefrom do not have satisfactory (adequate) mechanical strength.

Solid electrolytes are also known, generally those used in connection with fuel cells, which are stabilized with yttrium oxide ($Y_2O_3$) and/or ytterbium oxide ($Yb_2O_3$) sometimes with further addition of alumina (DE-PS No. 1,671,704). However, since the yttrium oxide and particularly the ytterbium oxide are expensive materials, the use of these materials to stabilize solid electrolytes is expensive and not an economic means of the type desired for a product which is mass produced in large quantities.

THE INVENTION

The present invention provides stabilized zirconium dioxide containing silicate flux and stabilized with a mixture of calcium oxide and magnesium oxide. The total of the calcium oxide and magnesium oxide is preferably between about 15 and 20 mole percent, with 16–18 mole percent especially preferred. The mole ratio of calcium oxide to magnesium oxide is between about 6:1 and 0.75:1, with a mole ratio of between 4:1 and 2:1 being preferred.

The stabilized zirconium dioxide compositions contain silicate flux, preferably in an amount between 0.5 and 5% by weight of the total oxide content of the stabilized zirconium dioxide. Preferably, the compositions contain between 2 and 4% of the silicate flux with about 3% being particularly preferred.

The preferred silicate fluxes are those containing $SiO_2$ in combination with an oxide of aluminum, calcium or magnesium. Preferred silicate fluxes include mixed silica and alumina oxides and, preferably, those in which the mole ratio between them 2:1, particularly kaolin. Talc and wollastonite are other preferred silicate fluxes.

Stabilized zirconium dioxide having the characteristic of a particularly low temperature at which the specific resistance reaches a value of 1MΩ cm are produced when up to about 5% of the calcium oxide is replaced with yttrium oxide and/or ytterbium oxide. Preferably 0.5 to 3.0 mole percent and more preferably 1.0 to 1.5 mole percent of the calcium oxide are replaced by the said other oxides.

Particularly preferred stabilized zirconium dioxide compositions are prepared containing between 16 and 18 mole percent of a total of calcium oxide and magnesium oxide with a ratio therebetween 4:1 and 2:1, which compositions contain between 2% and 4% of silicate flux. Such compositions are particularly advantageous when they also contain yttrium oxide and/or ytterbium oxide in an amount which replaces up to 5% of the calcium oxide. Where reference is made to replacing up 5% of the calcium oxide, the percentage referred to is replacement of up to 5 mole percent of the calcium oxide based on the total oxide mole content of the stabilized zirconium dioxide composition. The inclusion of such amounts of yttrium oxide and/or ytterbium oxide does not significantly affect the total cost of the product.

The invention also provides oxygen sensors containing at least one measuring cell which utilizes the stabilized zirconium dioxide compositions (after sintering) as the solid electrolyte of the measuring cells which are oxygen concentration cells. The sintered solid electrolytes have excellent mechanical strength, over 300 $N/mm^2$ with only a small variation from this value. The temperature at which solid articles prepared from the stabilized zirconium dioxides reach a specific resistance of 1MΩ cm is considerably lower than the temperature required to reach a comparable specific resistance in known ceramic articles. This high mechanical strength is desirable since it results in long service life and a low sensitivity to mechanical stress which could cause damage. The low temperature at which the specific resistance reaches the desired value of 1MΩ cm is desirable since this value is an indication of a low threshold temperature at which the solid electrolyte becomes operative when joining two electrodes to form an oxygen concentration cell and becomes operative by exhibiting a sufficient conductivity for the oxygen ions.

The stabilized zirconium dioxide articles of the present invention are formed at a sintering temperature between 1460° and 1480° C. This relatively low sintering temperature is of great economic importance in connection with the manufacture of mass-produced articles.

Solid articles which may be used as work pieces and also test specimens are formed from the powdered stabilized zirconium dioxide of the present invention by the usual fabrication methods used in ceramic manufacture. The individual components are thoroughly mixed to form a homogenous mixture of powders. A portion of such powders is then filled into a die and then compacted to form the green compact which is then sintered, preferably at the temperatures of between 1460° and 1480° C. to form the solid electrolyte which is incorporated into the oxygen sensor. In some instances, the solid electrolyte is sintered simultaneously with other components of the oxygen sensor as is well known in the art.

Three compositions were prepared as noted hereinabove containing a $SiO_2/Al_2O_3$ (mole ratio of 2:1). Composition 1 is a prior art type stabilized zirconium dioxide containing 17.5 mole percent CaO as the stabilizer. Several compositions were prepared with flux content varying up to about 3%, as depicted on curve 1 in FIG. 1, in which the temperature $T_W$ is plotted against the flux content. $T_W$ is the temperature at which the sintered zirconium dioxide solid reaches a specific resistance of 1M$\Omega$ cm. As noted, this temperature is a measurement (indication) of the so-called threshold temperature (i.e., the temperature at which the solid electrolyte begins to exhibit adequate conductivity of oxygen ions so that it is useful as the solid electrolyte of oxygen concentration cells). Curve 1 illustrates that there is not a clearly defined dependence of the temperature $T_W$ in relation to the flux content. At a flux content of about 3% by weight, $T_W$ is 400° C. The solid composition 1 required a sintering temperature of about 1500° C. and the solid did not have satisfactory mechanical strength.

Figure 1:
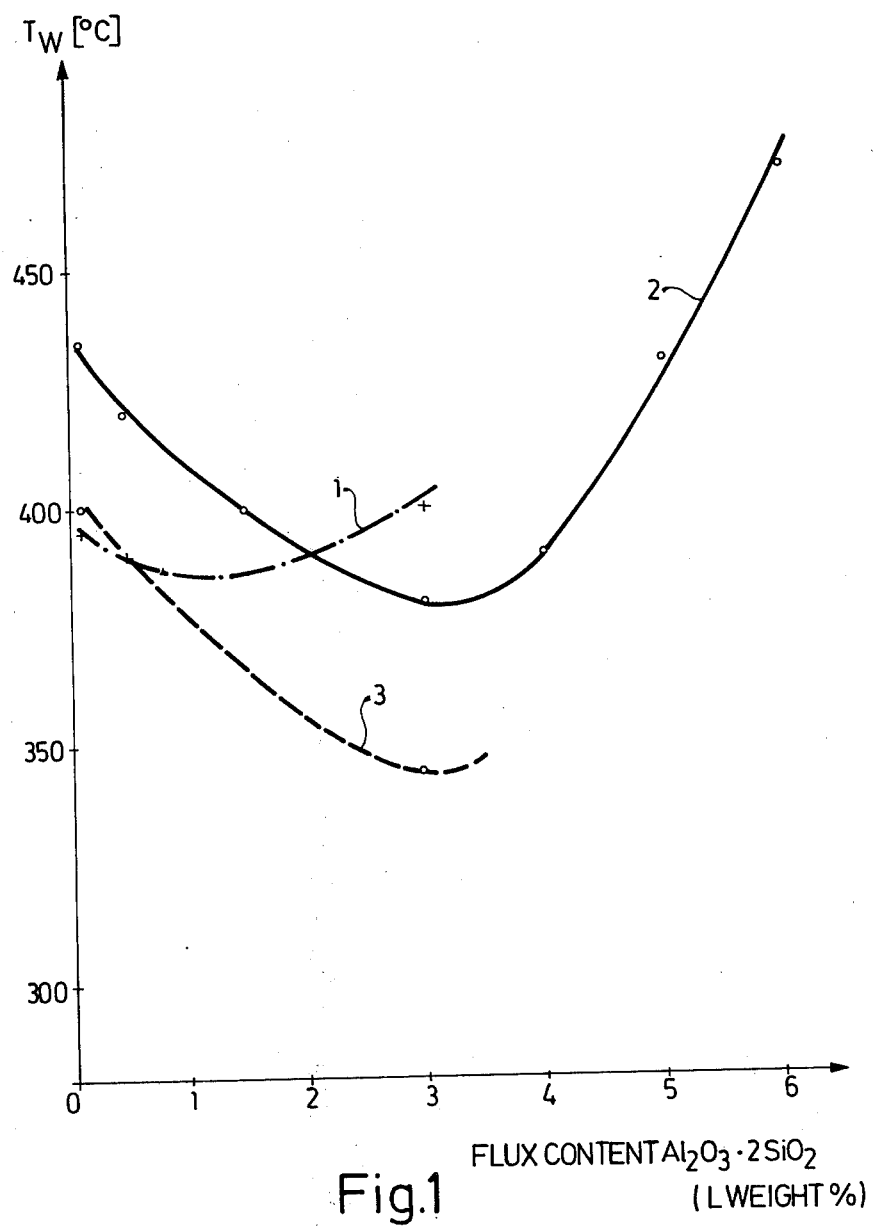
FIG. 1 is a graph depicting the variation of the specific resistance with flux content for three compositions.

Composition 2 is a stabilized zirconium dioxide stabilized with 12.5 mole percent of CaO and 5 mole percent of MgO. The silicate flux was added in amounts up to about 6% as depicted in FIG. 1, curve 2. The curve illustrates that the $T_W$ temperature is about 380° C. when the flux content is 3% by weight. Composition 2 was prepared by sintering a powdery mixture having a specific surface in excess of 14 m²/g. The composition was sintered at a temperature of about 1460° and 1480° C. The mechanical strength of the sintered solid was in excess of 300 N/mm² with a variation of less than 10%.

Composition 3 is a zirconium dioxide stabilized with 10 mole percent CaO, 5 mole percent, MgO, and 1.25 mole percent $Y_2O_3$. Different samples were stabilized with silicate flux in amounts up to about 3% as illustrated in FIG. 1, curve 3. As depicted on the curve, the temperature $T_W$ of the specimen containing 3% flux is only 345° C. The sintering temperature used and the mechanical strength of composition 3 were the same values as those of composition 2.

Compositions 2 and 3 as depicted in curves 2 and 3 exhibit a definite relationship and dependence of the temperature $T_W$ upon the flux content of the composition. As illustrated therein, the conductivity of articles produced from the zirconium dioxide compositions containing yttrium oxide and/or ytterbium oxide as partial substitution for the calcium oxide is increased. The increase in flux also increases the sinter activity of the unsintered zirconium dioxide with the result that such compositions may be sintered at lower temperatures to form the solid articles.

Figure 2:
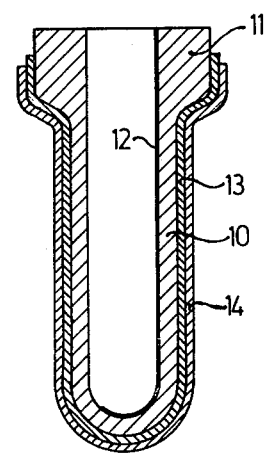
FIG. 2 illustrates a typical oxygen sensor of the present invention.

The oxygen sensors of the present invention include at least one measuring cell comprising a solid electrolyte formed from the sintered stabilized zirconium dioxide of the present invention spaced between and in ion communication with two electrodes as illustrated in FIG. 2 wherein the main portion of the electrical sensor is formed from the stabilized zirconium dioxide solid electrolyte 10 in the form of a closed tube. An inner electrode 12 is located at the inside of the tube. This electrode may, for example, be a conductive track, coating or strip made of a noble metal or other material which is electron conductive at the operating temperature. The outer surface of the solid electrolyte tube 10 is at least partially covered by a catalytically active electrode 13, for example, platinum. The entire outer surface of the sensor adapted to contact the exhaust gases is preferably coated with a porous electrically insulating coating 14, for example, of magnesium spinel. In the preferred electrical sensor illustrated, the open end has a flange 11 which is adapted to be enclosed in the housing.

The electrical sensors of the present invention also include those containing a plurality of measuring cells and, particularly, those disclosed in German patent application P 27 18 907.7 filed on Apr. 28, 1977, the content of which is hereby incorporated by this reference.

We claim:
1. A stabilized zirconium dioxide composition with a substantially lowered temperature at which the specific resistivity of the composition, in sintered condition, goes below 1M$\Omega$ cm, which composition contains: (i) calcium oxide and (ii) magnesium oxide as stabilizers, said stabilizers being present in a total amount of between 16 and 18 mole percent, with a mole ratio of calcium oxide to magnesium oxide of between 4:1 and 2:1 except to any extent that between 0.5 and 5 mole percent of said stabilizing calcium oxide is replaced by at least one oxide selected from the group consisting of yttrium oxide and ytterbium oxide, and also containing between 2 and 4% percent by weight of kaolin used as a flux, the remainder of the composition consisting essentially of zirconium dioxide.

2. The zirconium dioxide of claim 1 in which the amount of calcium oxide replaced by an oxide stabilizer selected from the group consisting of yttrium oxide and ytterbium oxide is between 0.5 and 3 mole percent.

3. The zirconium dioxide of claim 1 in which the amount of calcium oxide replaced by an oxide stabilizer selected from the group consisting of yttrium oxide and ytterbium oxide is between 1.0 and 1.5 mole percent.

4. An oxygen sensor particularly useful for determining the oxygen content of exhaust gases from internal combustion engines containing at least one oxygen concentration measuring cell, each said measuring cell comprising at least one catalytically active electrode adapted to be contacted with the said exhaust gases, and a second electrode separated from said catalytically active electrode and in ion communication therewith by a solid stabilized zirconium dioxide electrolyte composed of the sintered zirconium dioxide composition of claim 1.

* * * * *